(No Model.)
J. D. WENTWORTH.
METHOD OF MAKING BUTTON HOLES.
No. 368,035. Patented Aug. 9, 1887.
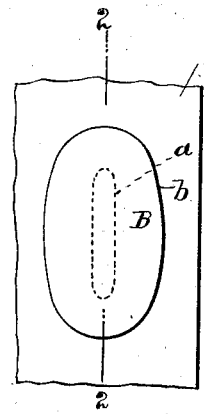  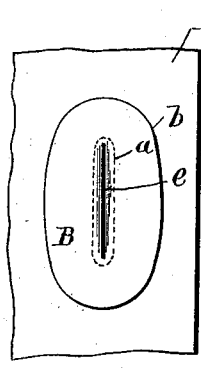 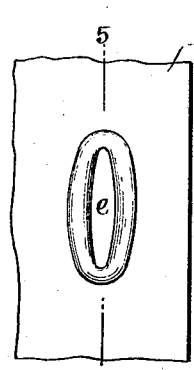 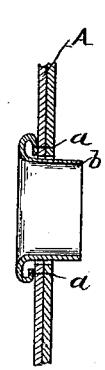
Fig. 1.  Fig. 2.  Fig. 3.  Fig. 4.  Fig. 5.
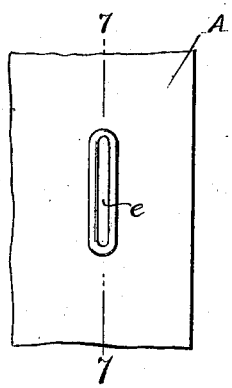 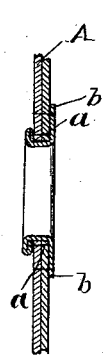 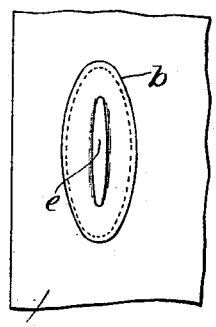
Fig. 6.  Fig. 7.  Fig. 8.
WITNESSES:
Frank Pease.
George H. Williams.
INVENTOR:
John D. Wentworth
By
Atty

UNITED STATES PATENT OFFICE.

JOHN D. WENTWORTH, OF LYNN, MASSACHUSETTS.

METHOD OF MAKING BUTTON-HOLES.

SPECIFICATION forming part of Letters Patent No. 368,035, dated August 9, 1887.

Application filed April 13, 1887. Serial No. 234,585. (No model.)

*To all whom it may concern:*

Be it known that I, JOHN D. WENTWORTH, of Lynn, in the county of Essex and Commonwealth of Massachusetts, have invented certain Improvements in Methods of Making Button-Holes, of which the following, taken in connection with the accompanying drawings, is a specification.

This invention relates to button-holes, and particularly to button-holes for linen coats and other similar articles intended for washing.

The nature of this invention is fully described and specifically claimed hereinafter.

Referring to the drawings, Figure 1 is a plan view illustrating the first step to be taken in forming the button-hole. Fig. 2 is a section on line 2 2. Fig. 3 is a plan view illustrating the second step to be taken in forming the button-hole. Fig. 4 is a similar view and illustrates the third step. Fig. 5 is a section on line 5 5. Fig. 6 is a plan view of the right side of the finished button-hole. Fig. 7 is a section on line 7 7. Fig. 8 is a plan view of the wrong side of the finished button-hole.

A designates the material in which the button-hole is to be worked or bound, and B is the binding material, which should be chamois or similar wash-leather. It is placed upon the material A, and is stitched to the material A by a line of stitching, *a*, as represented in Fig. 1. Said line of stitching *a* is extended about the edges of the intended button-hole, as shown. The button-hole *e* is then cut through both pieces of material, as shown in Fig. 3, and the edges *b* are next lifted and pushed through the hole *e*, as shown in Fig. 4, (Fig. 5 is a section of this view,) and when drawn fully through and down upon the material A the edges *b* are stitched to the material by a line of stitching, *f*, as shown in Fig. 8, which is a plan view of the material, showing the wrong side of the button-hole. The right side is presented in Fig. 6, while Fig. 7 is a section thereof.

The binding material B should be composed of chamois-skin wherever it is applied to material intended for frequent washing, as the chamois-skin will not harden or shrink by washing, but will stretch and adapt itself to the material. Besides, it is soft and pliable. Of course other material can be successfully used; but I prefer to use chamois, as I obtain most satisfactory results therewith.

I am aware that it has been proposed to form button-holes in two thicknesses of material by first slitting the upper layer, then placing pads over said slits, stitching said pads to the edges of the slits, and cutting through said pads in the line of the slits, then turning the outer edges of the pads inward, inserting them through the slits, and turning them outward on the under side, and, finally, placing the lower layer of the material over the upper one, covering the pads, slitting said lower layer, and stitching through the two layers and the pads, and I do not broadly claim this. My invention consists in forming a button-hole in one thickness of material by first securing a binding-piece to the material in which the button-hole is to be made by a row of stitching, which marks the place to be cut, then cutting the opening through both the material and binding-piece, and finally drawing the outer edges of the binding-piece through the slit to the other side and stitching them in this position.

I claim—

The method of forming and binding button-holes, which consists in first attaching the stay or binding piece to the material in which the button-hole is to be made by a line of stitching, *a*, then cutting the hole through both the binding-pieces and the material within the line of the stitching, then lifting the outer edge of the binding-piece, turning it over upon itself, and drawing it through the hole to the opposite side of the material, and finally attaching it to the material, substantially as described.

JOHN D. WENTWORTH.

Witnesses:
C. B. TUTTLE,
G. H. WILLIAMS.